US011561572B2

(12) United States Patent
Goldin et al.

(10) Patent No.: US 11,561,572 B2
(45) Date of Patent: Jan. 24, 2023

(54) CLOCK DISTRIBUTION AND ALIGNMENT USING A COMMON TRACE

(71) Applicant: Renesas Electronics America Inc., Milpitas, CA (US)

(72) Inventors: Leon Goldin, Ottawa (CA); Greg Armstrong, Ottawa (CA)

(73) Assignee: Renesas Electronics America, Inc., Milpitas, CA (US)

( * ) Notice: Subject to any disclaimer, the term of this patent is extended or adjusted under 35 U.S.C. 154(b) by 0 days.

(21) Appl. No.: 17/136,579

(22) Filed: Dec. 29, 2020

(65) Prior Publication Data

US 2022/0206525 A1      Jun. 30, 2022

(51) Int. Cl.
*G06F 1/04*  (2006.01)
*G06F 1/14*  (2006.01)
*G06F 1/10*  (2006.01)

(52) U.S. Cl.
CPC . *G06F 1/14* (2013.01); *G06F 1/10* (2013.01)

(58) Field of Classification Search
CPC ..................................... G06F 1/14; G06F 1/10
USPC ........................................................ 327/291
See application file for complete search history.

(56) References Cited

U.S. PATENT DOCUMENTS

| 9,479,182 | B1 * | 10/2016 | Baidas .................. H04L 7/00 |
| 10,075,284 | B1 * | 9/2018 | Rodrigues .............. H04L 49/30 |
| 11,088,816 | B1 * | 8/2021 | Sarda ..................... G06F 13/40 |
| 11,088,819 | B1 * | 8/2021 | Sarda ..................... H04L 7/0037 |
| 2013/0084062 | A1 * | 4/2013 | Hu ......................... H04L 49/10 398/2 |
| 2019/0379475 | A1 * | 12/2019 | Seethamraju ......... H04J 3/0667 |
| 2021/0328758 | A1 * | 10/2021 | Sarda ....................... H04L 7/04 |

* cited by examiner

*Primary Examiner* — Ryan Jager
(74) *Attorney, Agent, or Firm* — Scully, Scott, Murphy & Presser, P.C.

(57) ABSTRACT

Methods and system for clock alignment are described. In an example, a timing device can distribute a clock signal to a line card via a trace of a backplane. The timing device can further send a pulse to the line card at a first time via the trace. The timing device can further receive a return pulse from the line card at a second time via the trace. The timing device can determine a time difference between the first time and the second time. The time difference can indicate a propagation delay associated with the line card and the trace. The timing device can send the time difference to the line card. The line card can adjust a phase delay offset of the line card using the time difference.

20 Claims, 6 Drawing Sheets

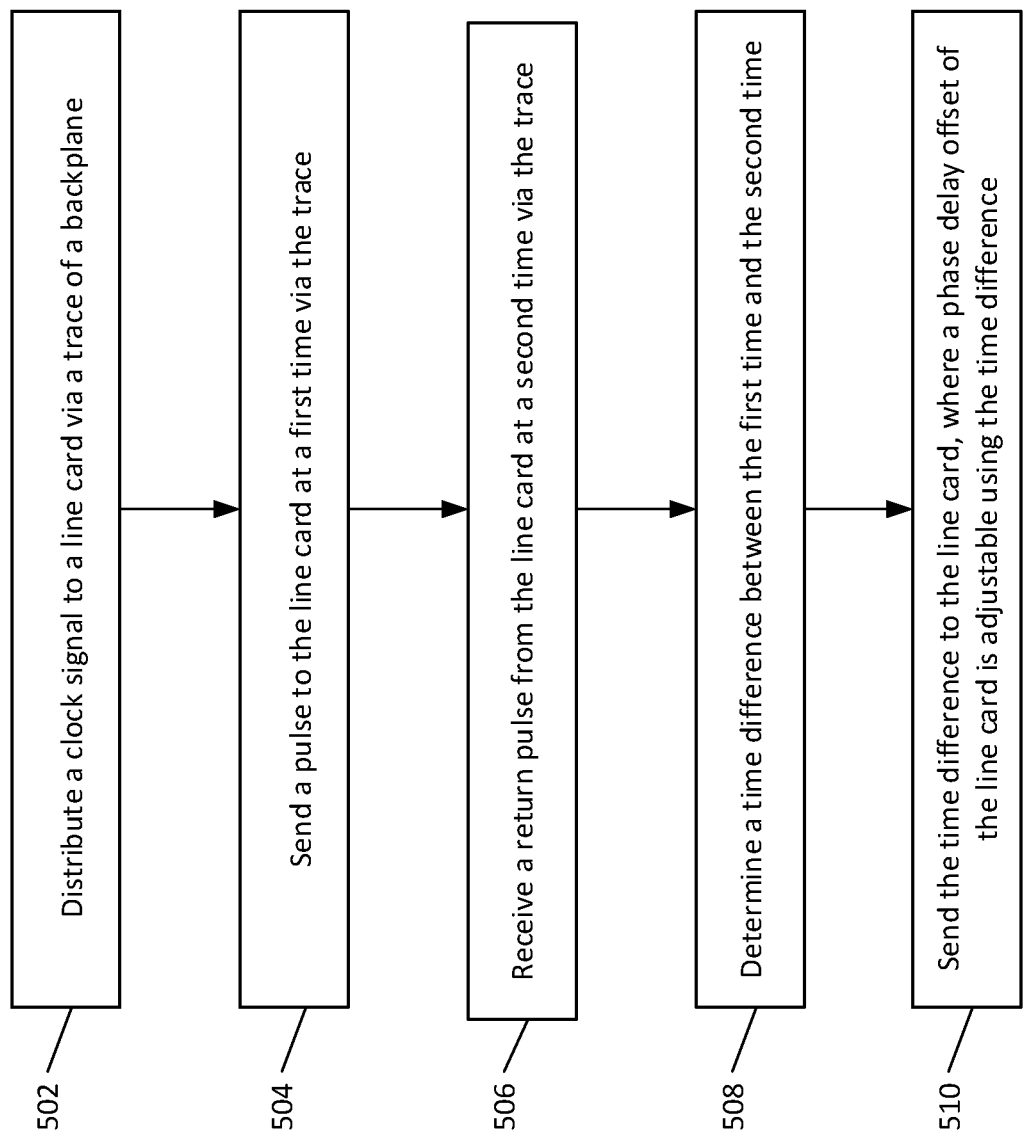

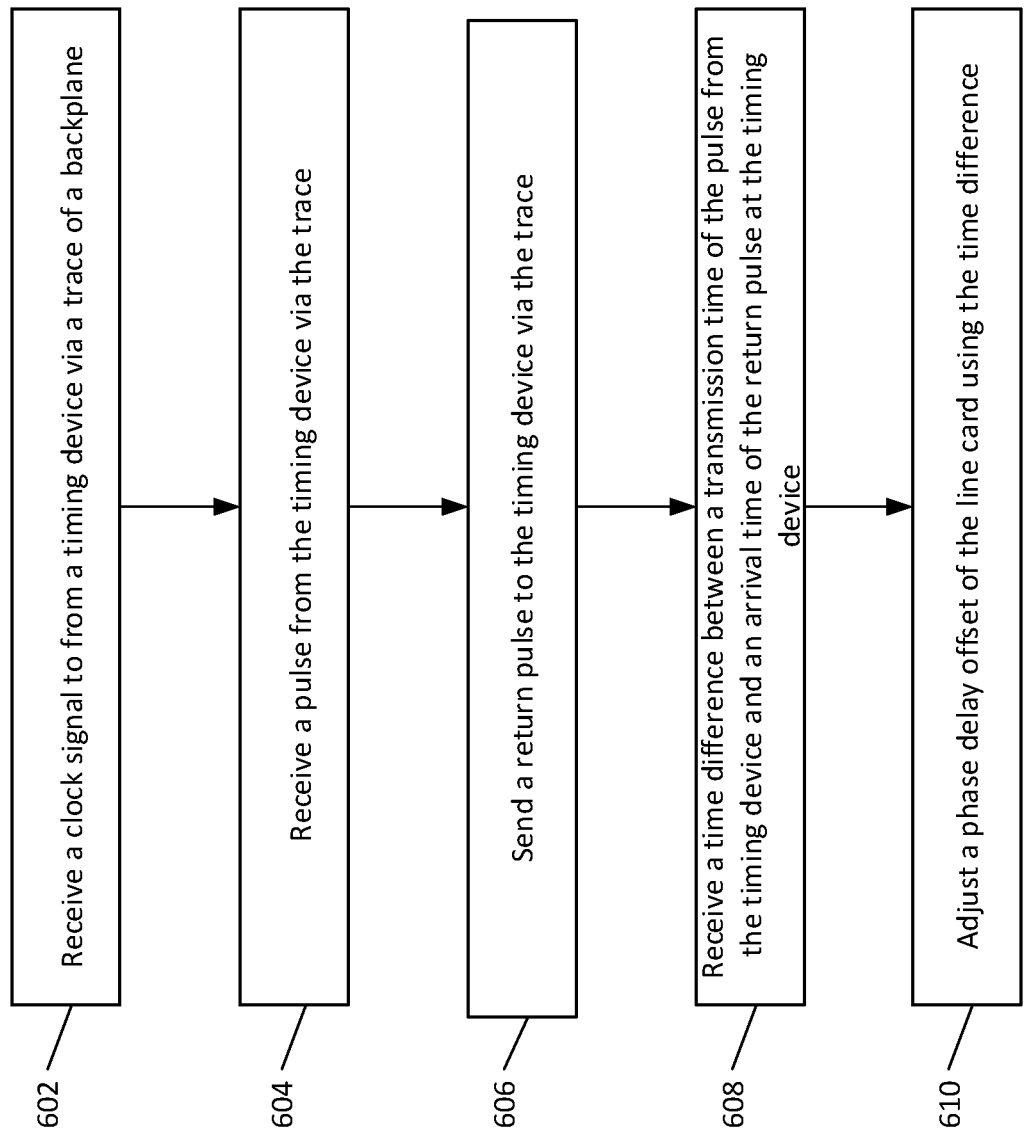

CLOCK DISTRIBUTION AND ALIGNMENT USING A COMMON TRACE

BACKGROUND

Unless otherwise indicated herein, the materials described in this section are not prior art to the claims in this application and are not admitted to be prior art by inclusion in this section.

A communication equipment (e.g., a network element) can include a plurality of line cards and a clock source that can provide clock signals to the plurality of line cards. A timing card can operate as a master device that distributes the clock signals to the plurality of line cards. The clock signals can be distributed via a backplane having a plurality of traces, where the plurality of traces can vary in size.

SUMMARY

In some examples, a method for clock alignment in a network element is generally described. The method can include distributing, by a timing device, a clock signal to a line card via a trace of a backplane. The method can further include sending, by the timing device, a pulse to the line card at a first time, wherein the pulse is being sent to the line card via the trace. The method can further include receiving, by the timing device, a return pulse from the line card at a second time, where the return pulse can be received via the trace. The method can further include determining, by the timing device, a time difference between the first time and the second time. The time difference can be indicative of a propagation delay associated with the line card and the trace. The method can further include sending, by the timing device, the time difference to the line card. A phase delay offset of the line card can be adjustable using the time difference.

In some examples, a system for clock alignment in a network element is generally described. The system can include a timing device, a backplane coupled to the timing device, and a line card coupled to the backplane. The timing device can be configured to distribute a clock signal to a line card via a trace of a backplane. The timing device can be further configured to send a pulse to a line card at a first time, where the pulse can be sent to the line card via the trace. The timing device can be further configured to receive a return pulse from the line card at a second time, where the return pulse can be received via the trace. The timing device can be further configured to determine a time difference between the first time and the second time. The time difference can be indicative of a propagation delay associated with the line card and the trace. The timing device can be further configured to send the time difference to the line card. The line card can be configured to adjust a phase delay offset of the line card using the time difference.

In some examples, a system for clock alignment in a network element is generally described. The system can include a timing device, a backplane coupled to the timing device, a buffer coupled to the timing device and the backplane, and a plurality of line cards coupled to the buffer and the backplane. The timing device can be configured to send a clock signal to the buffer via a first trace of a backplane. The timing device can be further configured to send a pulse to the buffer at a first time, where the pulse can be sent to the buffer via a first trace of the backplane. The buffer can be configured to distribute the clock signal to the plurality of line cards via a plurality of traces of the backplane. The buffer can be further configured to send the pulse to the plurality of line cards via the plurality of traces of the backplane. The buffer can be further configured to receive a return pulse from a line card via a second trace. The line card can be among the plurality of line cards, and the second trace can be among the plurality of traces. The buffer can be further configured to send the return pulse to the timing device via the first trace. The timing device can be further configured to receive the return pulse, at a second time, from the buffer via the first trace. The timing device can be further configured to determine a time difference between the first time and the second time. The time difference can be indicative of a propagation delay associated with the line card, the buffer, the first trace, and the second trace. The timing device can be further configured to send the time difference to the line card. The line card can be configured to adjust a phase delay offset of the line card using the time difference.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 5 illustrates a flow diagram relating to a process to implement clock distribution and alignment using a common trace in one embodiment.

FIG. 6 illustrates a flow diagram relating to a process to implement clock distribution and alignment using a common trace in one embodiment.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

A communication equipment can include a plurality of line cards and a timing device configured to distribute clock signals to the plurality of line cards. The clock signals can be distributed through a backplane coupled between the timing device and the plurality of line cards. The timing device can operate as a master clock device and distribute the clock signals to the line cards operating as slave devices. The distributed clock signals can be phase aligned across the plurality of line cards. A communication system may require communication equipment to have precise phase alignment across the line cards receiving the distributed clock signals. The varying size of traces in the backplane, and operating conditions (e.g., environment, temperature, etc.) of the communication equipment, can contribute to different amount of delays across the line cards. In some examples, techniques such as static propagation delay compensation can be used to align the clocks across the line cards, but may be unable to compensate effects caused by operating conditions such as temperature variation on different transmission lines or traces.

To be described in more detail below, the methods and systems being described in accordance with the present disclosure can provide improved phase alignment across a plurality of line cards by using the same trace to distribute clock signals and to exchange a request signal that can be used to estimate propagation delays of the plurality of line cards. By using the same trace to distribute the clock signals and the request signals, the signal length of signals being transmitted over the backplane to the plurality of line cards can be irrelevant. Further, by using the same trace to distribute the clock signals and the request signals, propagation delay errors caused by component asymmetry (e.g., different trace lengths) can be reduced. Furthermore, the timing device and the line cards in accordance with the present disclosure can implement a control scheme to toggle input and output ports such that the exchange of the request signals may not interrupt normal clock signal distributions.

Figure 1:
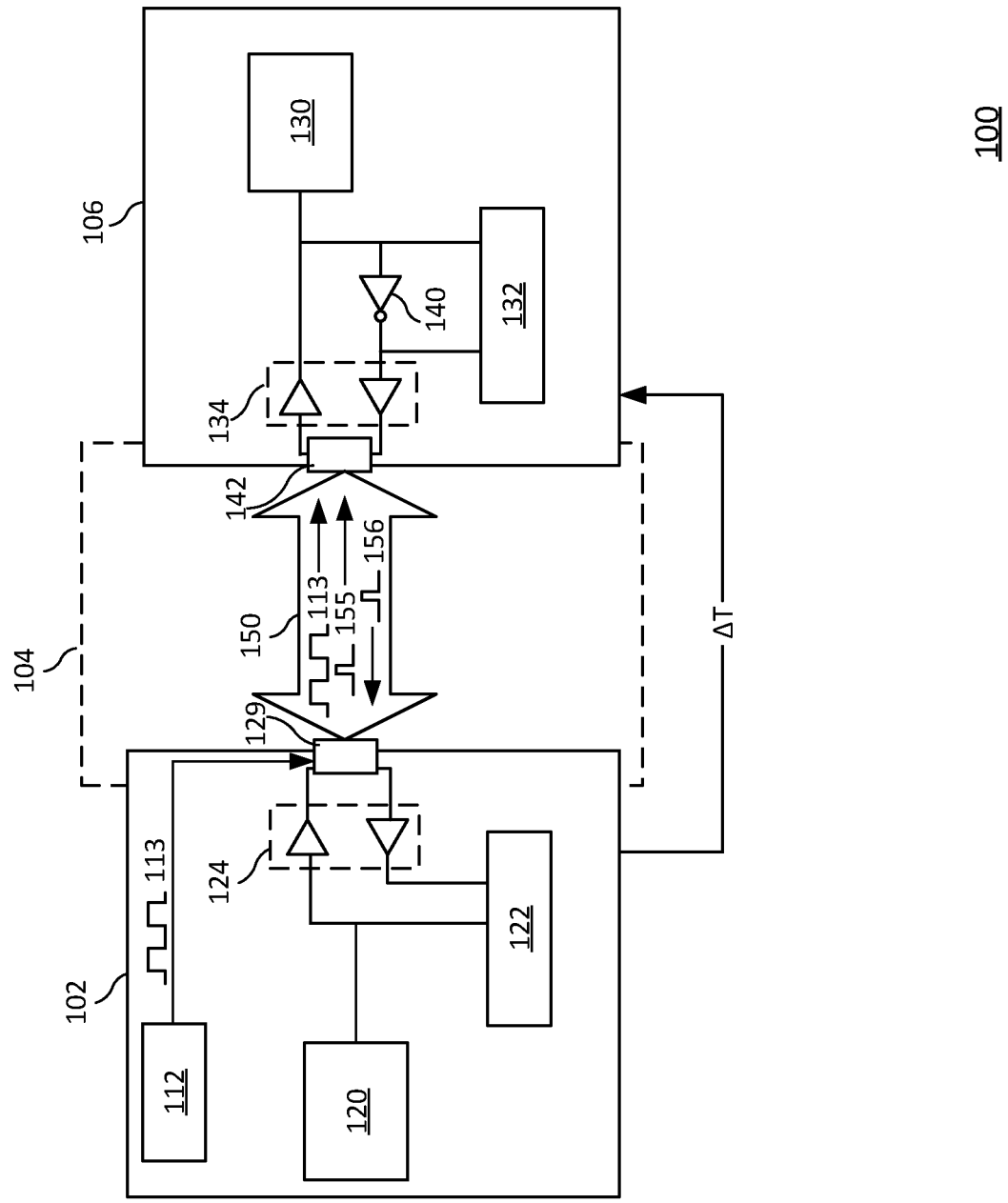
FIG. 1 illustrates an example system for implementing clock distribution and alignment using a common trace in one embodiment.

FIG. 1 illustrates an example system for implementing clock alignment using common trace clock distribution, arranged in accordance with at least some embodiments presented herein. System 100 can be implemented in a communication equipment, such as a network element. Examples of network elements can include, but not limited to, routers, servers, hubs, switches, access points, etc. The system 100 can include a timing device (or timing card) 102, a backplane 104, and a plurality of line cards including a line card 106. In some examples, the timing device 102 can include a clock generator 112 configured to generate a clock signal 113. In some examples, the timing device 102 can receive a clock signal from a clock generator separated from the timing device 102. The timing device 102 can operate as a master device that distributes the clock signal 113 to a plurality of slave devices, such as a plurality of line cards including the line card 106. The backplane 104 can include a plurality of traces, and the clock signal 113 can be transmitted from the timing device 102 to the plurality of line cards via the plurality of traces. The backplane 104 can include unidirectional or bi-directional traces.

The timing device 102 can include a processor 120, a converter 122, and a switching circuit 124. The processor 102 can be a microprocessor, a controller, a microcontroller, and/or other types of hardware processing element. The processor 120 can be integrated into the timing device 102, or can be electrically coupled to the timing device 102. The processor 102 can be electrically coupled to the converter 122. The converter 122 can be a time-to-digital converter (TDC) configured to detect a signal event (e.g., rising or falling edge of signals) and convert the detected signal event to a digital representation indicating a time in which the detected signal event occurred. For example, the converter 122 can measure a time interval between arrival times of two signals and convert the time interval into a digital representation indicating the time interval.

The switching circuit 124 can be coupled between the processor 120 and a port 129 (e.g., an input/output port) of the timing device 102. The processor 120 can be configured to control the switching circuit 124 to switch between an input mode and an output mode of the timing device 102. The input mode of the timing device 102 can allow the timing device 102 to receive signals via a particular trace of the backplane 104, and the output mode of the timing device 102 can allow the timing device 102 to output signals using the same particular trace. By switching between the input and output modes, one signal transmission direction can be allowed on the particular trace at one time, causing signals to be transmitted or received by the timing device 102 using the same trace.

The line card 106 can include a processor 130, a converter 132, a switching circuit 134, and an inverter 140. The processor 130 can be a microprocessor, a controller, a microcontroller, and/or other types of hardware processing element. The processor 130 can be integrated into the line card 106, or can be electrically coupled to the line card 106. The processor 130 can be electrically coupled to the converter 132. The converter 132 can be a time-to-digital converter (TDC) configured to detect a signal event (e.g., rising or falling edge of signals) and convert the detected signal event to a digital representation indicating a time in which the detected signal event occurred. The inverter 140 can be configured to invert a signal being received at the line card 106 in order to return the received signal back to the sender (e.g., the timing device 102). In some examples, the processor 130 can generate a return pulse that may be different from the signal received from the timing device, and can return the generated return pulse to the timing device 102.

The switching circuit 134 can be coupled between the processor 130 and a port 142 (e.g., input/output port) of the line card 106. The processor 130 can be configured to control the switching circuit 134 to switch between an input mode and an output mode of the line card 106. The input mode of the line card 106 can allow the line card 106 to receive signals via a particular trace of the backplane 104, and the output mode of the line card 106 can allow the line card 106 to output signals using the same particular trace. By switching between the input and output modes, one signal transmission direction can be allowed on the particular trace at one time, causing signals to be transmitted or received by the line card 106 using the same trace.

In an example shown in FIG. 1, the timing device 102 can distribute the clock signal 113 to the line card 106 via a trace 150 of the backplane 104. The trace 150 can be a bidirectional trace. The timing device 102 can be operating in an output mode in order to transmit the clock signal 113 to the line card 106. The timing device 102, or the processor 120, can further generate a request signal, such as a pulse 155, and transmit the pulse 155 to the line card 106 via the same trace 150. The timing device 102 can be operating in the output mode in order to transmit the pulse 155 to the line card 106. The processor 120 can also distribute the pulse 155 to the converter 122. The converter 122 can receive the pulse 155 and determine a time of arrival T1 of the pulse 155 at the converter 122. Subsequent to outputting the pulse 155, the processor 120 can control the switching circuit 124 to switch the timing device 102 to an input mode.

The line card 106 can receive the pulse 155, and the pulse 155 can be further received by the processor 130 and the converter 132. The line card 106 can be in an input mode in order to receive the pulse 155. In response to receiving the pulse 155, the processor 130 can control the switching circuit 134 to switch the line card 106 to an output mode. Further, the converter 132 can receive the pulse 155 and determine a time of arrival T2 of the pulse 155 at the converter 132. Furthermore, the pulse 155 arriving at the line card 106 can be returned to the timing device 102 via the inverter 140 and the port 142. The pulse being returned to the timing device 102 is labeled as a return pulse 156 in FIG. 1. The line card 106 can be operating in the output mode in order to send the return pulse 156 to the timing device 102. The return pulse 156 can be distributed to the converter 132 such that the converter 132 can determine a time of departure T3 of the return pulse 156 departing at the converter 132. The converter 132 can further determine and output a time difference TR between T2 and T3, where the time difference TR can indicate a duration in which the pulse 155 resides in the line card 106. In response to outputting the return pulse 156, the processor 130 can control the switching circuit 134 to switch the line card 106 to the input mode. In some examples, the processor 130 can store TR in a local memory of the processor 130 or the line card 106.

The timing device 102 can receive the return pulse 156, and the return pulse 156 can be received by the converter 122. The converter 122 can determine a time of arrival T4 of the return pulse 156 at the converter 122. The converter 122 can determine a time difference $\Delta T$ between T1 and T4, where the time difference $\Delta T$ can be a round-trip time (RTT) of the pulse 155 being transmitted from the timing device 102 to the line card 106 and returned to the timing device 102. In an example, the time difference $\Delta T$ can be determined by measuring a difference between the positive edges of the pulse 155 and the return pulse 156. The timing device 102 can transmit the time difference $\Delta T$ to the line card 106. The timing device 102 can transmit the time difference $\Delta T$ to the line card 106 using the same trace 150, or using an arbitrary interface such as, for example, pulse width modulation (PWM), serial, or out-of-band interface. The line card 106 can receive $\Delta T$ and can adjust its own clock offset or phase delay offset using $\Delta T$ and TR.

The timing device 102 can transmit the pulse 155 to multiple line cards, including the line card 106, periodically. For example, if the system 100 is being implemented in an environment that may be relatively unstable (e.g., frequent and significant temperature changes), then the timing device 102 can distribute the pulse 155 to the plurality of line cards more frequently, such as in between every transmission of the clock signal 113. In another example, if the system 100 is being implemented in a relatively stable environment (e.g., less frequent or significant temperature changes), the timing device 102 can send the pulse 155 to the plurality of line cards relatively less frequently, such as waiting for multiple transmissions of the clock signal 113 before sending the pulse 155. The pulse 155 can be distributed to multiple line cards, but only one return pulse can be received by the timing device 102 at one time. In order to have the timing device 102 receive one or more return pulses, the timing device 102 can include multiple output ports, where each one of the multiple output ports can be designated for one line card.

In an example, the pulse 155 can be aligned with a 1-pulse per second (PPS) signal or other frame indicator in order to avoid additional phase markings. A size or pulse width of the pulse 155 can be subject to a constraint where the round-trip time, or the time difference $\Delta T$, is less than or equal to a difference between a clock cycle of the clock signal 113 and a combination of i) a pulse width of the pulse 155, ii) a pulse width of the return pulse 156, and iii) the durations to switch input/output modes at the timing device 102 and the line card(s). The round-trip time, or the time difference $\Delta T$, can indicate a propagation delay to transmit the clock signal 113 from the timing device 102 to the line card 106 using the trace 150. Since the pulse 155 and the return pulse 156 are transmitted using the same trace (trace 150) as the clock signal 113, the backplane 104 may be designed to have relatively less traces, which may reduce a device size of a device (e.g., a network element) implementing the system 100. In other words, the system 100 need not to use two difference traces to transmit the clock signal 113 and the pulse 155 (or the return pulse 156). Further, propagation delay caused by environmental variations of the same trace (e.g., trace 150) can be identical for the transmissions of both the pulse 155 and the return pulse 156. The propagation delay between the timing device 102 and the line card 106 can be determined without a need to consider different trace lengths.

Figure 2:
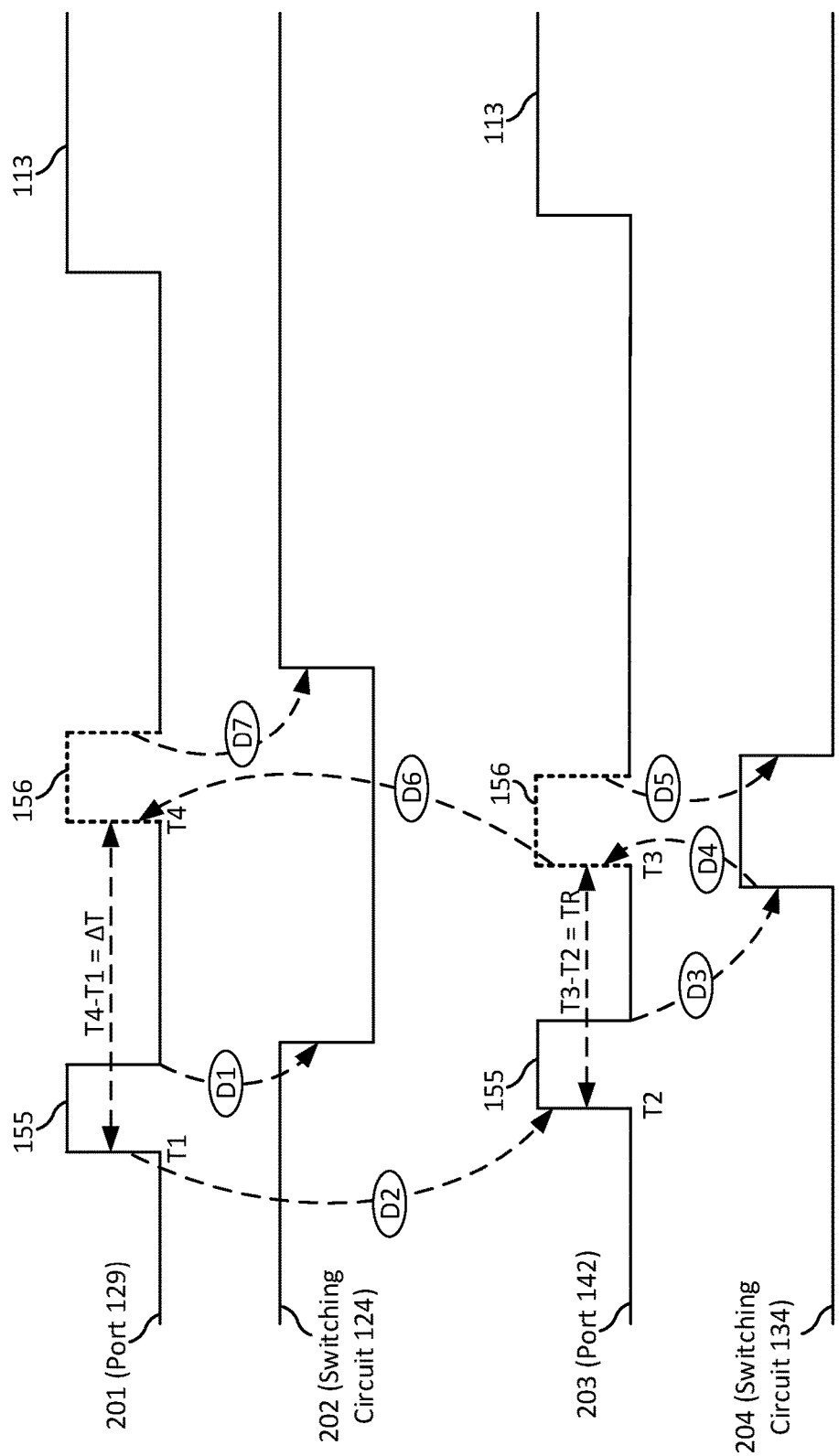
FIG. 2 illustrates an example implementation of the example system of FIG. 1, in one embodiment.

FIG. 2 illustrates an example implementation of the system 100 of FIG. 1, arranged in accordance with at least some embodiments presented herein. The example shown FIG. 2 illustrates signal lines 201, 202, 203, and 204. The signal line 201 includes signal events that can occur on the input/output (I/O) port 129 of the timing device 102 shown in FIG. 1. The signal enable line 202 includes signal enabling events that can occur on the switching circuit 124 of the timing device 102 shown in FIG. 1. A "high" signal on the signal enable line 202 indicates an activation of the output mode, and/or a deactivation of the input mode, of the timing device 102. A "low" signal on the signal enable line 202 indicates an activation of the input mode, and/or a deactivation of the output mode, of the timing device 102. The signal line 203 includes signal events that can occur on the input/output (I/O) port 142 of the line card 106 shown in FIG. 1. The signal enable line 204 includes signal enabling events that can occur on the switching circuit 134 of the line card 106 shown in FIG. 1. A "high" signal on the signal enable line 204 indicates an activation of the output mode, and/or a deactivation of the input mode, of the line card 106. A "low" signal on the signal enable line 204 indicates an activation of the input mode, and/or a deactivation of the output mode, of the line card 106. In the example shown in FIG. 2, the pulse width of the pulse 155 is 4 nanoseconds (ns) and the pulse width of the return pulse 156 is 4 ns. Note that the time values (e.g., pulse width of pulse 155 and return pulse 156 and various delays) being described with respect to the example shown in FIG. 2 are merely example values, and these time values can be arbitrary and dependent on a desired implementation of the system 100.

Focusing on the signal line 201 and the signal enable line 202, at time T1, the timing device 102 can transmit the pulse 155 to the line card 106 when the switching circuit 124 is enabled (e.g., timing device 102 is in an output mode). The time T1 can be a time subsequent to a complete transmission of the clock signal 113 from the timing device 102 to the line card 106 via the trace 150. In response to completely outputting the pulse 155, a switching time D1, such as 1 ns, can be given to the switching circuit 124 to disable the output mode of the timing device 102 and to enable the input mode of the timing device 102 by switching to the "low" signal.

Focusing on the signal line 203 and the signal enable line 204, at time T2, the line card 106 can receive the pulse 155 when the switching circuit 134 is disabled (e.g., the line card 106 is in input mode). Note that there can be a delay D2, such as 1 ns, between T1 and T2, indicating that the pulse 155 took 1 ns to be transmitted from the timing device 102 to the line card 106 via the trace 150. In response to completely receiving the pulse 155, a delay D3, such as 6 ns, may be needed for the line card 106 to detect the pulse 155 and to invert the pulse 155. The delay D3 can also be adjusted to ensure that the output mode of the timing device 102 is disabled before enabling the output mode of the line card 106 or to disable the input mode of the line card 106. The line card 106 can use a switching time of D4, such as 1 ns, to switch the switching circuit 134. In response to enabling the output mode of the line card 106, the line card 106 can transmit the return pulse 156 to the timing device 102 at time T3. The processor 130 of the line card 106 can determine a residence time TR=T3−T2 and can store the residence time in local memory. In the example shown in FIG. 2, the residence time TR can be 11 ns. In response to completely outputting the return pulse 156, such as after a lapse of 4 ns (the pulse width of return pulse 156) from T3, a switching time of D5, such as 1 ns, can be given to the switching circuit 134 to disable the output mode of the line card 106 and to enable the input mode of the line card 106. Note that the delays indicated in FIG. 2 are merely examples, and these delays can be adjustable to accommodate different situations of the implementation of the system 100. For example, the delay D3 can be increased to provide additional time to ensure that the pulse 155 has completely left the timing device 102 before the timing device 102 disables its output mode.

Focusing on the signal line 201 and the signal enable line 202, at time T4, the timing device can receive the return pulse 156 when the switching circuit 124 is disabled (e.g., the timing device is in input mode). Note that there can be a delay D6, such as 1 ns, between T3 and T4, indicating that the return pulse 156 took 1 ns to be transmitted from the line card 106 to the timing device 102 via the trace 150. In response to completely receiving the return pulse 156, a delay D7, such as 3 ns, may be needed for the timing device 102 to detect the return pulse 156, to switch the switching circuit 124 to enable the output mode of the timing device 102, and to ensure that the output mode of the line card 106 is disabled before switching the switching circuit 124 to enable the output mode of the timing device 102. In an example, the timing device 102 may need to reserve sufficient time before driving the switching circuit 124 to "high" in order to minimize effect on jitter (e.g., by adjusting the delay D7). The timing device 102 can also have a pull-down resistor to keep the switching circuit 124 signal "low" if no return pulse comes back. The timing device 102 can determine the round-trip time, or the time difference ΔT, by determining a difference between T1 and T4. In the example shown in FIG. 2, the time difference ΔT can be 13 ns. The timing device 102 can transmit the time difference ΔT to the line card 106 using the same trace 150, or using another interface or transmission line different from the trace 150. In response to enabling the output mode of the timing device 102, the timing device 102 can return to normal operation where the clock signal 113 can be distributed to the line card 106 via the trace 150.

Figure 3:
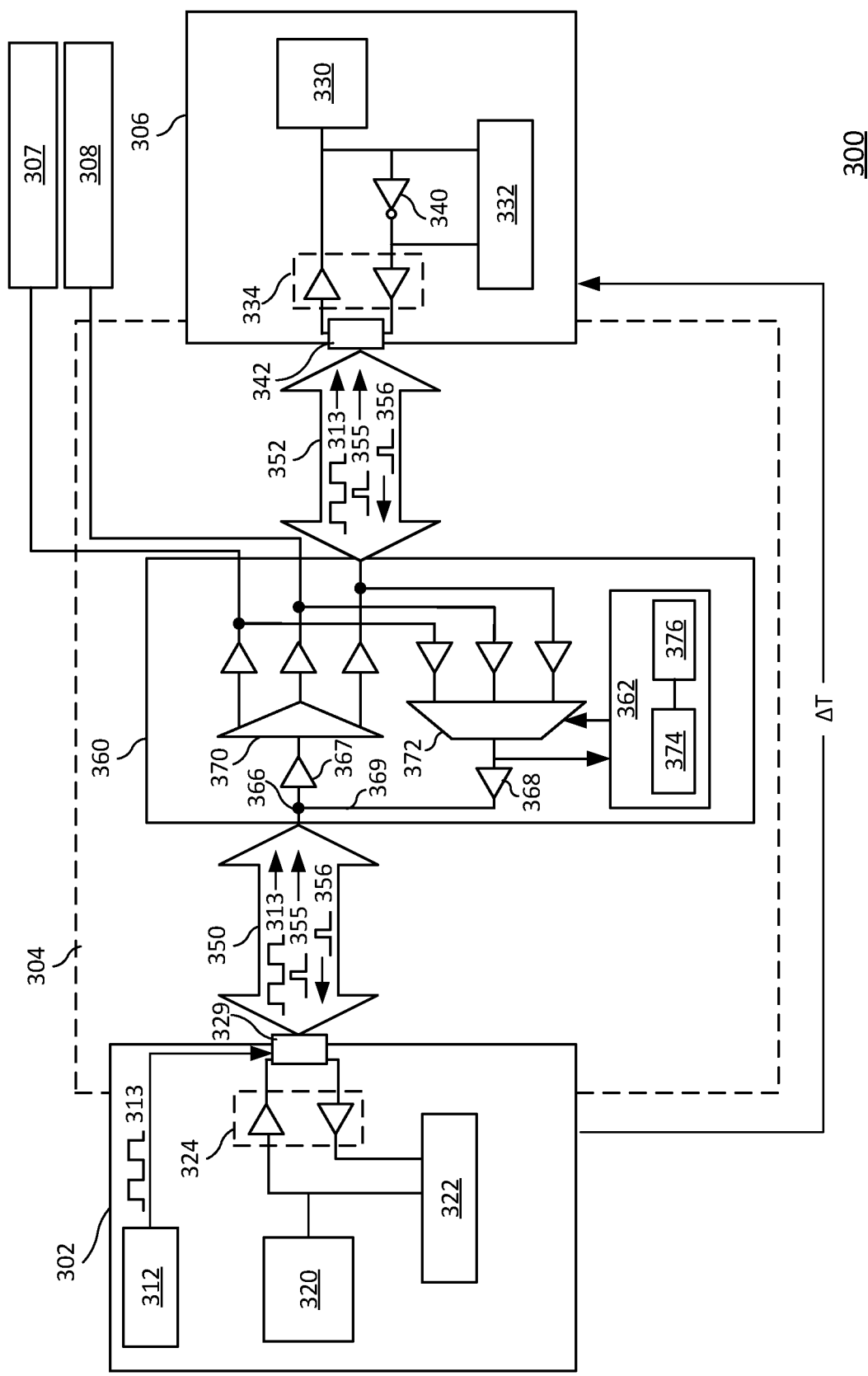
FIG. 3 illustrates an example system for implementing clock distribution and alignment using a common trace in one embodiment.

FIG. 3 illustrates an example system 300 for implementing clock alignment using common trace clock distribution, arranged in accordance with at least some embodiments presented herein. System 300 can be implemented in a communication equipment, such as a network element. Examples of network elements can include, but not limited to, routers, servers, hubs, switches, access points, etc. The system 300 can include a timing device (or timing card) 302, a backplane 304, a plurality of line cards including at least line cards 306. 307, 308, and a buffer 360. In some examples, the timing device 302 can include a clock generator 312 configured to generate a clock signal 313. In some examples, the timing device 302 can receive a clock signal from a clock generator separated from the timing device 302. The timing device 302 can operate as a master device that distributes the clock signal 313 to a plurality of slave devices, such as the plurality of line cards. The backplane 304 can include a plurality of traces, and the clock signal 313 can be transmitted from the timing device 302 to the plurality of line cards via the buffer 360 using the plurality of traces. The backplane 304 can include unidirectional or bi-directional traces.

The timing device 302 can include a processor 320, a converter 322, and a switching circuit 324. The processor 320 can be a microprocessor, a controller, a microcontroller, and/or other types of hardware processing element. The processor 320 can be integrated into the timing device 302, or can be electrically coupled to the timing device 302. The processor 320 can be electrically coupled to the converter 322. The converter 322 can be a time-to-digital converter (TDC) configured to detect a signal event (e.g., rising or falling edge of signals) and convert the detected signal event to a digital representation indicating a time in which the detected signal event occurred. For example, the converter 322 can measure a time interval between arrival times of two signals and convert the time interval it into a digital representation indicating the time interval.

The switching circuit 324 can be coupled between the processor 320 and a port 329 (e.g., an input/output port) of the timing device 302. The processor 320 can be configured to control the switching circuit 324 to switch between an input mode and an output mode of the timing device 302. The input mode of the timing device 302 can allow the timing device 302 to receive signals via a particular trace of the backplane 304, and the output mode of the timing device 302 can allow the timing device 302 to output signals using the same particular trace. By switching between the input and output modes, one signal transmission direction can be allowed on the particular trace at one time, causing signals to be transmitted or received by the timing device 302 using the same trace.

In an example embodiment, the line cards 306, 307, 308 can include identical components. Using the line card 306 as an example, the line card 306 can include a processor 330, a converter 332, a switching circuit 334, and an inverter 340. The processor 330 can be a microprocessor, a controller, a microcontroller, and/or other types of hardware processing element. The processor 330 can be integrated into the line card 306, or can be electrically coupled to the line card 306. The processor 330 can be electrically coupled to the converter 332. The converter 332 can be a time-to-digital converter (TDC) configured to detect a signal event (e.g., rising or falling edge of signals) and convert the detected signal event to a digital representation indicating a time in which the detected signal event occurred. The inverter 340 can be configured to invert a signal being received at the line card 306 in order to return the received signal back to the sender (e.g., the timing device 302 or the buffer 360).

The switching circuit 334 can be coupled between the processor 330 and a port 342 (e.g., input/output port) of the line card 306. The processor 330 can be configured to control the switching circuit 334 to switch between an input mode and an output mode of the line card 306. The input mode of the line card 306 can allow the line card 306 to receive signals via a particular trace of the backplane 304, and the output mode of the line card 306 can allow the line card 306 to output signals using the same particular trace. By switching between the input and output modes, one signal transmission direction can be allowed on the particular trace at one time, causing signals to be transmitted or received by the line card 306 using the same trace.

The buffer 360 can include a controller 362, a fanout buffer 370, a multiplexer 372, a switch 367, and a switch 368. The fanout buffer 370 can be configured to create multiple copies of the clock signal 313 and distribute the copies of the clock signal 313 to multiple line cards such as the line cards 306, 307, 308. The controller 362 can include a pulse detector 374. In some example embodiments, the pulse detector 374 can include a pulse width modulation (PWM) decoder. The pulse detector 374 can be controlled by the controller 362 to detect whether the buffer 360 received a pulse other than the regular clock signal 313 from either the timing device 302 or the line card 306.

The controller 362 can be configured to control the multiplexer 372 based on outputs of the pulse detector 374. For example, based on an output of the pulse detector 374, the controller 362 can select one signal among a plurality of signals being sent from the line cards 306, 307, 308, to the multiplexer 372. Signals being transmitted from the line cards 306, 307, 308 can enter the input lines of the multiplexer 372 in a round-robin manner. In an example embodiment, a signal among multiple signals being received by the multiplexer 372 can be selected in a round-robin approach using an intra-integrated circuit ($I^2C$) controller that can be configured to implement an $I^2C$ serial communication protocol. In some examples, the $I^2C$ controller can be a component of the controller 362. In another example embodiment, if the controller 362 includes a PWM decoder, the PWM decoder can be configured to perform the selection of a signal among signals being received by the multiplexer 372 in a round-robin approach.

The switches 367 and 368 can be connected to an input/output (I/O) node 366 using a link 369, where the node 366 can be connected to a trace 350 of the backplane 304. The node 366 and/or the link 369 can be inside the buffer 360 or outside of the buffer 360. The controller 362 can be further configured to control the switches 367 and 368 to control a buffer direction of the buffer 360. For example, the controller 362 can switch on or activate the switch 367 to activate a first buffer direction, where the first buffer direction allows signals to flow from the timing device 302 to the line cards 306, 307, 308 via the buffer 360. The controller 362 can switch on or activate the switch 368 to activate a second buffer direction, where the second buffer direction allows signals to flow from the line cards 306, 307, 308 to the timing device 302 via the buffer 360. Note that the switches 367 and 368 cannot be simultaneously activated in order to allow the buffer 360 to pass signals in a single direction at a time.

In an example shown in FIG. 3, the timing device 302 can distribute the clock signal 313 to the buffer 360 via the trace 350 of the backplane 304. The trace 350 can be a bidirectional trace. The timing device 302 can be operating in an output mode in order to transmit the clock signal 313 to the buffer 360. The timing device 302 can further generate a request signal, such as a pulse 355, and transmit the pulse 355 to the buffer 360 via the same trace 350. The timing device 302 can be operating in the output mode in order to transmit the pulse 355 to the buffer 360. The processor 320 can also distribute the pulse 355 to the converter 322. The converter 322 can receive the pulse 355 and determine a time of arrival T1 of the pulse 355 at the converter 322. Subsequent to outputting the pulse 355, the processor 320 can control the switching circuit 324 to switch the timing device 302 to an input mode.

The buffer 360 can receive the pulse 355 when the switch 367 is activated and when the buffer 360 operates in the first buffer direction (e.g., signal flow from timing device 302 to line card 306). The fanout buffer 370 can create a plurality of copies of the pulse 355 and distribute the copies of the pulse 355 to multiple line cards, such as the line cards 306, 307, 308. The pulse 355 can be further received by the controller 362. The pulse 355 can be distributed to the line cards 306, 307, 308 using their corresponding traces. For example, the buffer 360 can send the pulse 355 to the line card 306 via a trace 352, where the trace 352 can be a bidirectional trace and different from other traces being used to transmit the pulse 355 to the line cards 307, 308. In an example, when the switch 367 is activated and the switch 368 is deactivated, the pulse 355 can flow to the controller 362 via the multiplexer 372. In some example embodiments, the pulse 355 can flow to the controller 362 via a direct connection between the node 366 and the controller 362, or between the buffer 370 and the controller 362. The pulse detector 374 can be configured to detect whether the buffer 360 received the pulse 355 or the clock signal 313. In an example, the pulse detector 374 can distinguish the pulse 355 from the clock signal 313 using various pulse detection techniques that are apparent to those of ordinary skill in the art. In response to the pulse detector 374 detecting receipt of the pulse 355 at the buffer 360, the controller 362 can deactivate the switch 367 and activate the switch 368 to activate the second buffer direction of the buffer 360 (e.g., signal flow from line card 306 to timing device 302).

The line card 306 can be in an input mode in order to receive the pulse 355 from the buffer 360 via the trace 352. In response to receiving the pulse 355, the processor 330 can control the switching circuit 334 to switch the line card 306 to an output mode. Further, the converter 332 can receive the pulse 355 and determine a time of arrival T2 of the pulse 355 at the converter 332. Furthermore, the pulse 355 arriving at the line card 306 can be returned to the buffer 360 via the inverter 340 and the port 342. The pulse being returned to the buffer 360 is labeled as a return pulse 356 in FIG. 3. The line card 306 can be operating in the output mode in order to send the return pulse 356 to the buffer 360 via the trace 352. The return pulse 356 can be distributed to the converter 332 and the converter 332 can determine a time of departure T3 of the return pulse 356 departing at the converter 332. The converter 332 can further determine and output a time difference TR between T2 and T3, where the time difference TR can indicate a duration in which the pulse 355 resides in the line card 306. In response to outputting the return pulse 356, the processor 330 can control the switching circuit 334 to switch the line card 306 to the input mode. The line cards 307 and 308 may operate in similar manner as the line card 306, and can send their respective return pulse to the buffer 360. In some examples, the processor 330 can store TR in a local memory of the processor 330 or the line card 306.

The buffer 360 can receive the return pulse 356 from the line card 306 when the switch 368 is activated and when the buffer 360 operates in the second buffer direction. The buffer 360 can also receive return pulses from the line cards 307, 308. When the switch 368 is activated and the switch 367 is deactivated, the return pulses being received at the buffer 360 can flow to the multiplexer 372. The controller 362 can send a selection signal to the multiplexer 372 to select one return pulse among the received return pulses. The selection of the one return pulse among the received return pulses can be controlled using an $I^2C$ controller or a PWM decoder that can be part of the controller 362. In an example, if the return pulse 356 of the line card 306 is selected, then the multiplexer 372 can output the return pulse 356. The return pulse 356 can flow through the switch 368 to the node 366, and to the timing device 302 via the trace 350. In response to the return pulse 356 being transmitted out of the buffer 360, the controller 362 can deactivate the switch 368 and activate the switch 367 to allow signal flow from the timing device 302 towards the line cards 306, 307, 308.

The timing device 302 can receive the return pulse 356 from the buffer 360, and the return pulse 356 can be received by the converter 322. The converter 322 can determine a time of arrival T4 of the return pulse 356 at the converter 322. The converter 322 can determine a time difference ΔT between T1 and T4, where the time difference ΔT can be a round-trip time (RTT) of the pulse 355 being transmitted from the timing device 302 to the line card 306 and returned to the timing device 302. In an example, the time difference ΔT can be determined by determining a time difference between the positive edge of the pulse 355 and the positive edge of the return pulse 356. The timing device 302 can transmit the time difference ΔT to the line card 306. The timing device 302 can transmit the time difference ΔT to the line card 306 using an arbitrary interface such as, for example, pulse width modulation (PWM), serial, or out-of-band interface. The line card 306 can receive ΔT and can adjust its own clock offset using ΔT or phase delay offset using ΔT and TR.

The timing device 302 can transmit the pulse 355 to the line cards 306, 307, 308, via the buffer 360 periodically. For example, if the system 300 is being implemented in an environment that may be relatively unstable (e.g., frequent and significant temperature changes), then the timing device 302 can distribute the pulse 355 to the plurality of line cards 306, 307, 308 more frequently, such as in between every transmission of the clock signal 313. In another example, if the system 300 is being implemented in a relatively stable environment (e.g., less frequent or significant temperature changes), the timing device 302 can send the pulse 355 to the plurality of line cards 306, 307, 308 relatively less frequently, such as waiting for multiple transmissions of the clock signal 313 before sending the pulse 355. The pulse 355 can be distributed to multiple line cards, but only one return pulse can be received by the timing device 302 at one time. In order to have the timing device 302 receive one return pulse at a time, the buffer 360 can select one return pulse among the return pulses received at the multiplexer 372 using a round-robin approach. For example, in response to the multiplexer 372 outputting the return pulse 356 from the line card 306 to the timing device 302, the controller 362 can modify the selection signal for the multiplexer 372 to listen to a next line card, such as the line card 307 or 308. If one line card is selected, the return pulses being transmitted by other line cards can be ignored. By using the buffer 360 to select one return pulse at a time, the timing device 302 can receive one return pulse from each transmission of the pulse 355 to the plurality of line cards.

In an example, the pulse 355 can be aligned with a 1-pulse per second (PPS) signal or other frame indicator in order to avoid additional phase markings. A size or pulse width of the pulse 355 can be subject to a constraint where the round-trip time (e.g., ΔT) is less than or equal to a difference between a clock cycle of the clock signal 313 and a combination of i) a pulse width of the pulse 355, ii) a pulse width of the return pulse 356, and iii) the durations to switch buffer directions of the buffer 360 and to switch input/output modes at the timing device 302 and the line card(s). The round-trip time (e.g., ΔT) can indicate a propagation delay to transmit the clock signal 313 from the timing device 302 to the line card 306 using the trace 150 and the buffer 360. Since the clock signal 313, the pulse 355, and the return pulse 356 are transmitted using the same traces (traces 350 and 352), the backplane 304 may be designed to have relatively less traces, which may reduce a device size of a device (e.g., a network element) implementing the system 300. Further, propagation delay caused by environmental variations of the same trace (e.g., traces 350 and 352) can be identical for the transmissions of both the pulse 355 and the return pulse 356 are transmitted using the same traces. The propagation delay between the timing device 302 and the line card 306 can be determined without a need to consider different trace lengths.

Figure 4:
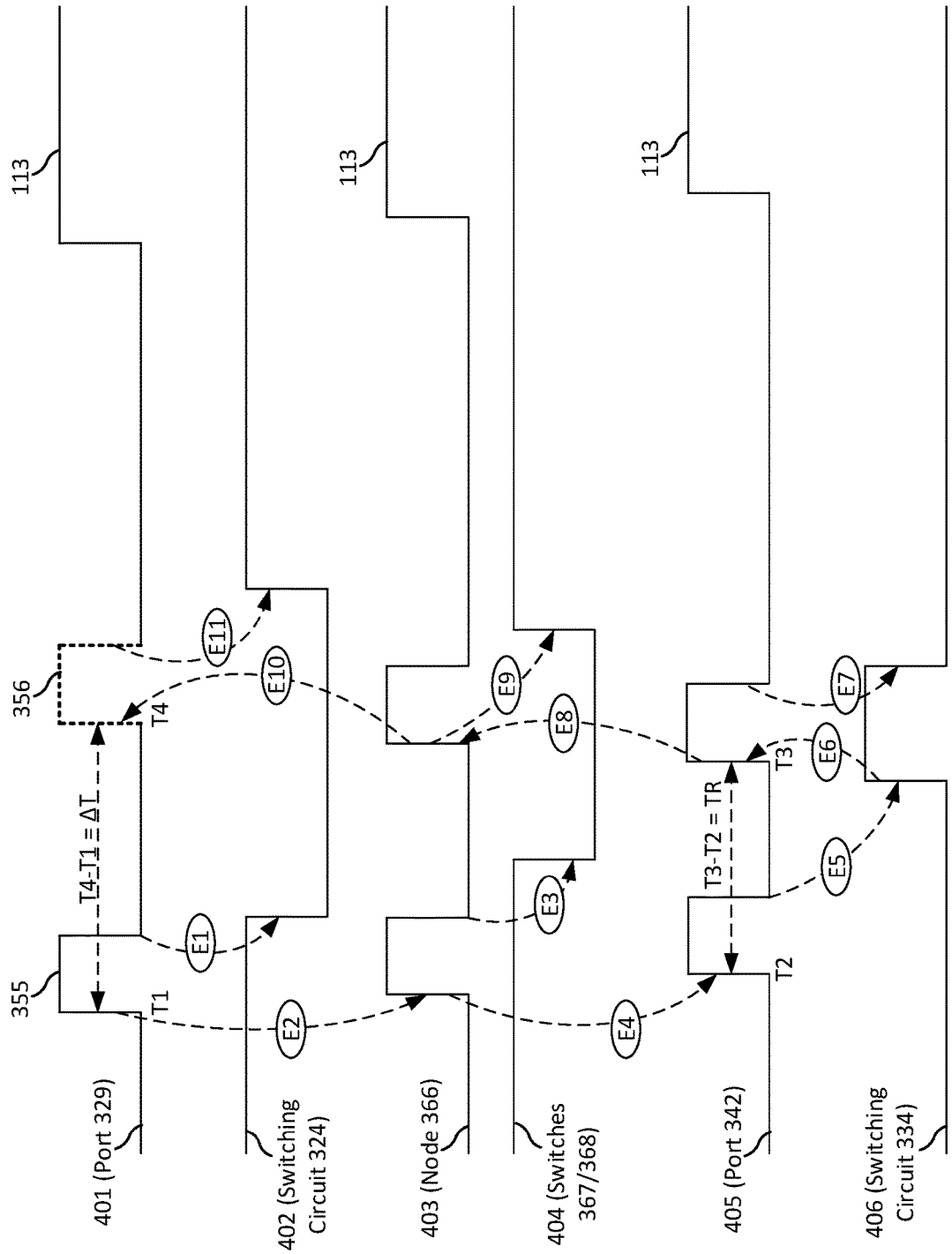
FIG. 4 illustrates an example implementation of the example system of FIG. 3, in one embodiment.

FIG. 4 illustrates an example implementation of the system 300 of FIG. 3, arranged in accordance with at least some embodiments presented herein. The example shown FIG. 4 illustrates signal lines 401, 402, 403, 404, 405, and 406. The signal line 401 includes signal events that can occur on the input/output (I/O) port 329 of the timing device 302 shown in FIG. 3. The signal enable line 402 includes signal enabling events that can occur on the switching circuit 324 of the timing device 302 shown in FIG. 3. A "high" signal on the signal enable line 402 indicates an activation of the output mode, and/or a deactivation of the input mode, of the timing device 302. A "low" signal on the signal enable line 402 indicates an activation of the input mode, and/or a deactivation of the output mode, of the timing device 302. The signal line 403 includes signal events that can occur on the node 366 of the buffer 360 shown in FIG. 3. The signal enable line 404 includes signal enabling events that can occur on a signal being used to activate the switch 367 or switch 368 of the buffer 260 shown in FIG. 3. A "high" signal on the signal enable line 404 indicates an activation of the first buffer direction of the buffer 360, allowing signals to flow from the timing device 302 to the line card 306. A "low" signal on the signal enable line 404 indicates an activation of the second buffer direction of the buffer 360, allowing signals to flow from the line card 306 to the timing device 302. The signal line 405 includes signal events that can occur on the input/output (I/O) port 342 of the line card 306 shown in FIG. 3. The signal enable line 406 includes signal enabling events that can occur on the switching circuit 334 of the line card 306 shown in FIG. 3. A "high" signal on the signal enable line 406 indicates an activation of the output mode, and/or a deactivation of the input mode, of the line card 306. A "low" signal on the signal enable line 406 indicates an activation of the input mode, and/or a deactivation of the output mode, of the line card 306. In the example shown in FIG. 4, the pulse width of the pulse 355 is 4 nanoseconds (ns) and the pulse width of the return pulse 356 is 4 ns. Note that the time values (e.g., pulse width of pulse 355 and return pulse 356 and various delays) being described with respect to the example shown in FIG. 4 are merely example values, and these time values can be arbitrary and dependent on a desired implementation of the system 300.

Focusing on signal line 401 and signal enable line 402, at time T1, the timing device 302 can transmit the pulse 355 to the buffer 360 when the switching circuit 324 is enabled (e.g., timing device 302 is in output mode). The time T1 can be a time subsequent to a complete transmission of the clock signal 313 from the timing device 302 to the line card 306 via the buffer 360. In response to completely outputting the pulse 355, a switching time or delay E1, such as 1 ns, can be given to the switching circuit 324 to disable the output mode of the timing device 302 and enable the input mode of the timing device 302 by switching to the "low" signal.

Focusing on signal line 403 and signal enable line 404, the buffer 360 can receive the pulse 355 when the buffer 360 is operating in the first buffer direction (e.g., signal flow from the timing device 302 to the line card 306). Note that there can be a delay E2, such as 1 ns, between T1 and an arrival time of the pulse 155 at buffer 360, indicating that the pulse 355 took 1 ns to be transmitted from the timing device 302 to the buffer 360 via the trace 350. The buffer 360, operating under the first buffer direction, can transmit the pulse 355 to the line card 306 via the trace 352. In response to completely receiving the pulse 355, a delay E3, such as 3 ns, may be needed for the buffer 360 to switch from the first buffer direction to the second buffer direction (driving the signal on signal line 404 to "low").

Focusing on signal line 405 and signal enable line 406, at time T2, the line card 306 can receive the pulse 355 when the switching circuit 334 is disabled (e.g., the line card 306 is in input mode). Note that there can be a delay E4, such as 1 ns, between the departure time of the pulse 355 from the buffer 360 and the time T2, indicating that the pulse 355 took 1 ns to be transmitted from the buffer 360 to the line card 306 via the trace 352. In response to completely receiving the pulse 355, a delay E5, such as 6 ns, may be needed for the line card 306 to detect the pulse 355, invert the pulse 355, and to ensure that the output mode of the timing device 102 is disabled before switching the switching circuit 334 to enable the output mode of the line card 306 and to disable the input mode of the line card 306. The line card 306 can use a switching time of E6, such as 1 ns, to switch the switching circuit 334. In response to enabling the output mode of the line card 306, the line card 306 can transmit the return pulse 356 to the buffer 360 at time T3 via the trace 352. The processor 330 of the line card 306 can determine a residence time TR=T4−T2 and can store the residence time in local memory. In the example shown in FIG. 4, the residence time TR can be 11 ns. In response to completely outputting the return pulse 356, a switching time E7, such as 1 ns, can be given to the switching circuit 334 to disable the output mode of the line card 306 and to enable the input mode of the line card 306. Note that the delays indicated in FIG. 4 are merely examples, and these delays can be adjustable to accommodate different situations of the implementation of the system 100. For example, the delay E5 can be increased to provide additional time to ensure that the pulse 355 has completely left the buffer 360 before the buffer 360 switches its buffer direction.

Focusing on signal line 403 and signal enable line 404, the buffer 360 can receive the return pulse 356 when the buffer 360 is operating in the second buffer direction (e.g., signal flow from the line card 306 to the timing device 302). Note that there can be a delay E8, such as 1 ns, between T3 and the arrival time of the return pulse 356 at the buffer 360, indicating that the return pulse 356 took 1 ns to be transmitted from the line card 306 to the buffer 360 via the trace 352. The buffer 360, operating under the second buffer direction, can transmit the return pulse 356 to the timing device 302. In response to receiving the return pulse 356, a delay E9, such as 6 ns, may be needed for the buffer 360 to switch from the second buffer direction to the first buffer direction (driving the signal on signal line 404 to "high") and to ensure that the line card 306 has disabled its output mode (or to ensure that the return pulse 356 has completely left the line card 306). The buffer 360 can transmit the return pulse 356 to the timing device 302 under the first buffer direction.

Focusing on signal line 401 and signal enable line 402, at time T4, the timing device can receive the return pulse 356 when the switching circuit 324 is disabled (e.g., the timing device is in input mode). Note that there can be a delay E10, such as 1 ns, between the departure time of the return pulse 356 from the buffer 360 and T4, indicating that the return pulse 356 took 1 ns to be transmitted from the buffer 360 to the timing device 302 via the trace 350. In response to completely receiving the return pulse 356, a delay E11, such as 3 ns, may be needed for the timing device 302 to detect the return pulse 356, to switch the switching circuit 324 to enable the output mode of the timing device 302, and to ensure the buffer 360 is switched to the second buffer direction before enabling the output mode of the timing device 302. In an example, the timing device 302 may reserve sufficient time before driving the switching circuit 324 to "high" in order to minimize effect on jitter. The timing device 302 may also need to have a pull-down resistor to keep the switching circuit 324 signal "low" if no return pulse comes back. The timing device 302 can determine the round-trip time, or the time difference $\Delta T$, by determining a difference between T1 and T4. In the example shown in FIG. 4, the time difference $\Delta T$ is 15 ns. The timing device 302 can transmit the time difference $\Delta T$ to the line card 306 using another interface or transmission line different from the trace 350 or 352. In response to enabling the output mode of the timing device 302, the timing device 302 can return to normal operation where the clock signal 313 can be distributed to the line card 306 via the trace 350, the buffer 360, and the trace 352.

FIG. 5 illustrates a flow diagram relating to a process 500 to implement clock distribution and alignment using a common trace, arranged in accordance with at least some embodiments presented herein. The process 500 may be implemented using, for example, system 100 or system 300 discussed above. An example process may include one or more operations, actions, or functions as illustrated by one or more of blocks 502, 504, 506, 508, and/or 510. Although illustrated as discrete blocks, various blocks may be divided into additional blocks, combined into fewer blocks, eliminated, or performed in parallel, depending on the desired implementation.

The process 500 can begin at block 502, where a timing device can distribute a clock signal to a line card via a trace of a backplane. The process 500 can continue from block 502 to block 504. At block 504, the timing device can send a pulse to the line card at a first time, where the pulse can be sent to the line card via the trace. In response to sending the pulse to the line card, the timing device can deactivate an output mode of the timing device and activate an input mode of the timing device. The process 500 can continue from block 504 to block 506. At block 506, the timing device can receive a return pulse from the line card at a second time, where the return pulse can be received via the trace. In response to receiving the return pulse from the line card, the timing device can deactivate an input mode of the timing device and activate an output mode of the timing device.

The process 500 can continue from block 506 to block 508. At block 508, the timing device can determine a time difference between the first time and the second time. The time difference can be indicative of a propagation delay associated with the line card and the trace. The process 500 can continue from block 508 to block 510. At block 510, the timing device can send the time difference to the line card. A phase delay offset of the line card can be adjustable using the time difference. The timing device can send the time difference to the line card using an interface that may be different from the trace.

FIG. 6 illustrates a flow diagram relating to a process 600 to implement clock distribution and alignment using a common trace, arranged in accordance with at least some embodiments presented herein. The process 600 may be implemented using, for example, system 100 or system 300 discussed above. An example process may include one or more operations, actions, or functions as illustrated by one or more of blocks 602, 604, 606, 608, and/or 610. Although illustrated as discrete blocks, various blocks may be divided into additional blocks, combined into fewer blocks, eliminated, or performed in parallel, depending on the desired implementation.

The process 600 can begin at block 602, where a line card can receive a clock signal from a timing device via a trace of a backplane. The process 600 can continue from block 602 to block 604. At block 604, the line card can receive a pulse from the timing device via the trace. In response to receiving the pulse, the line card can deactivate an input mode of the line card and activate an output mode of the line card. The process 600 can continue from block 604 to block 606. At block 606, the line card can send a return pulse to the timing device via the trace. In response to sending the return pulse to the timing device, the line card can deactivate an output mode of the line card and activate an input mode of the line card.

The process 600 can continue from block 606 to block 608. At block 608, the line card can receive a time difference from the timing device. The time difference can be a difference between a transmission time of the pulse from the timing device and an arrival time of the return pulse at the timing device. The time difference can be indicative of a propagation delay associated with the line card and the trace. The process 600 can continue from block 608 to block 610. At block 610, the line card can adjust a phase delay offset of the line card using the time difference. The line card can receive the time difference from an interface that may be different from the trace.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for clock alignment in a network element, the method comprising:
    distributing, by a timing device, a clock signal to a line card via a trace of a backplane;
    sending, by the timing device, a pulse to the line card at a first time, wherein the pulse is being sent to the line card via the trace, and the clock signal and the pulse are received at a same port of the line card;
    receiving, by the timing device, a return pulse from the line card at a second time, wherein the return pulse is received via the trace;
    determining, by the timing device, a time difference between the first time in which the pulse is being sent from the timing device and the second time in which the return pulse is received by the timing device, wherein the time difference is indicative of a propagation delay associated with the line card and the trace; and
    sending, by the timing device, the time difference to the line card, wherein a phase delay offset of the line card is adjustable by the line card using the time difference.

2. The method of claim 1, wherein sending the time difference to the line card comprises sending, by the timing device, the time difference to the line card using the trace.

3. The method of claim 1, further comprising:
    in response to sending the pulse to the line card:
        deactivating, by the timing device, an output mode of the timing device; and
        activating, by the timing device, an input mode of the timing device;
    in response to receiving the return pulse from the line card:
        deactivating, by the timing device, an input mode of the timing device; and
        activating, by the timing device, an output mode of the timing device.

4. The method of claim 1, wherein determining the time difference comprises:
    operating a time-to-digital converter (TDC) to detect a rising edge of the pulse being sent from the timing device;
    operating the TDC to detect a rising edge of the return pulse being received by the timing device; and
    operating the TDC to convert the detected rising edge of the pulse and the detected rising edge of the return pulse into a digital representation of the time difference.

5. A system comprising:
    a timing device;
    a backplane coupled to the timing device;
    a line card coupled to the backplane;
    the timing device being configured to:
        distribute a clock signal to a line card via a trace of a backplane;
        send a pulse to a line card at a first time, wherein the pulse is being sent to the line card via the trace;
        receive a return pulse from the line card at a second time, wherein the return pulse is received via the trace;
        determine a time difference between the first time in which the pulse is being sent from the timing device and the second time in which the return pulse is received by the timing device, wherein the time difference is indicative of a propagation delay associated with the line card and the trace; and
        send the time difference to the line card;
    the line card being configured to:
        receive the clock signal and the pulse at a same port;
        receive the time difference from the timing device; and
        adjust a phase delay offset of the line card using the time difference.

6. The system of claim 5, wherein the timing device is configured to send the time difference to the line card using the trace.

7. The system of claim 5, wherein the line card is configured to invert the pulse to generate the return pulse.

8. The system of claim 5, wherein the timing device is further configured to:
in response to the pulse being sent to the line card:
deactivate an output mode of the timing device; and
activate an input mode of the timing device;
in response to the receipt of the return pulse from the line card:
deactivate an input mode of the timing device; and
activate an output mode of the timing device.

9. The system of claim 5, wherein the line card is further configured to:
in response to the pulse being received at the line card:
deactivate an input mode of the line card; and
activate an output mode of the line card;
in response to the output of the return pulse from the line card:
deactivate an output mode of the line card; and
activate an input mode of the line card.

10. The system of claim 5, wherein the line card is further configured to determine a residence time indicating a duration in which the pulse resides in the line card, wherein the determination of the phase delay offset is based on time difference and the residence time.

11. The system of claim 5, wherein the timing device includes a time-to-digital converter (TDC) configured to:
detect a rising edge of the pulse being sent from the timing device;
detect a rising edge of the return pulse being received by the timing device; and
convert the detected rising edge of the pulse and the detected rising edge of the return pulse into a digital representation of the time difference.

12. A system comprising:
a timing device;
a backplane coupled to the timing device;
a buffer coupled to the timing device and the backplane;
a plurality of line cards coupled to the buffer and the backplane;
the timing device being configured to:
send a clock signal to the buffer via a first trace of a backplane;
send a pulse to the buffer at a first time, wherein the pulse is being sent to the buffer via a first trace of the backplane;
the buffer being configured to:
distribute the clock signal to the plurality of line cards via a plurality of traces of the backplane;
send the pulse to the plurality of line cards via the plurality of traces of the backplane;
receive a return pulse from a line card via a second trace, wherein the line card is among the plurality of line cards, and the second trace is among the plurality of traces;
send the return pulse to the timing device via the first trace;
the timing device being further configured to:
receive the return pulse, at a second time, from the buffer via the first trace;
determine a time difference between the first time in which the pulse is being sent from the timing device and the second time in which the return pulse is received by the timing device, wherein the time difference is indicative of a propagation delay associated with the line card, the buffer, the first trace, and the second trace; and
send the time difference to the line card;
the line card being configured to:
receive the clock signal and the pulse at a same port;
receive the time difference from the timing device; and
adjust a phase delay offset of the line card using the time difference.

13. The system of claim 12, wherein the timing device is configured to send the time difference to the line card using the trace.

14. The system of claim 12, wherein the line card is configured to invert the pulse to return the pulse to the timing device as the return pulse.

15. The system of claim 12, wherein the timing device is further configured to:
in response to the pulse being sent to the line card:
deactivate an output mode of the timing device; and
activate an input mode of the timing device;
in response to the receipt of the return pulse from the line card:
deactivate an input mode of the timing device; and
activate an output mode of the timing device.

16. The system of claim 12, wherein the line card is further configured to:
in response to the pulse being received at the line card:
deactivate an input mode of the line card; and
activate an output mode of the line card;
in response to the output of the return pulse from the line card:
deactivate an output mode of the line card; and
activate an input mode of the line card.

17. The system of claim 12, wherein the line card is further configured to determine a residence time indicating a duration in which the pulse resides in the line card, wherein the determination of the phase delay offset is based on the time difference and the residence time.

18. The system of claim 12, wherein the buffer is further configured to select the line card from the plurality of line cards using a round-robin approach.

19. The system of claim 12, wherein:
the return pulse is a first return pulse;
the line card is a first line card,
the time difference is a first time difference; and
the buffer is further configured to:
receive a second return pulse from a second line card via a third trace, wherein the second line card is among the plurality of line cards, and the third trace is among the plurality of traces;
send the second return pulse to the timing device via the first trace;
the timing device being further configured to:
receive the second return pulse, at a third time, from the buffer via the first trace;
determine a second time difference between the first time and the third time, wherein the second time difference is indicative of a propagation delay associated with the second line card, the buffer, the first trace, and the third trace; and
send the second time difference to the second line card;
the second line card being configured to adjust a phase delay offset of the second line card using the second time difference.

20. The system of claim 12, wherein the timing device includes a time-to-digital converter (TDC) configured to:
detect a rising edge of the pulse being sent from the timing device;
detect a rising edge of the return pulse being received by the timing device; and convert the detected rising edge of the pulse and the detected rising edge of the return pulse into a digital representation of the time difference.

\* \* \* \* \*